No. 745,958. PATENTED DEC. 1, 1903.
T. EWAN.
MANUFACTURE OF SODIUM.
APPLICATION FILED APR. 18, 1903.
NO MODEL.
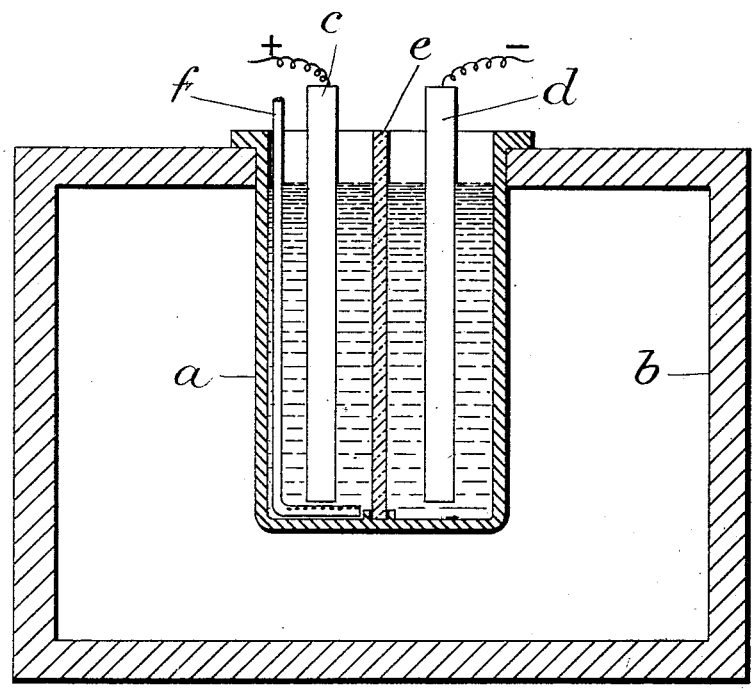

No. 745,958. Patented December 1, 1903.

UNITED STATES PATENT OFFICE.

THOMAS EWAN, OF GLASGOW, SCOTLAND, ASSIGNOR TO THE CASSEL GOLD EXTRACTING COMPANY, LIMITED, OF MARYHILL, GLASGOW, SCOTLAND.

MANUFACTURE OF SODIUM.

SPECIFICATION forming part of Letters Patent No. 745,958, dated December 1, 1903.

Application filed April 18, 1903. Serial No. 153,314. (No specimens.)

*To all whom it may concern:*

Be it known that I, THOMAS EWAN, a subject of His Majesty the King of Great Britain, residing at Glasgow, Scotland, have invented a certain new and useful Improvement in the Manufacture of Sodium, of which the following is a specification.

Sodium hydroxid is fused in a suitable vessel and a current of electricity passed through it between electrodes between which a porous diaphragm is placed in such a way that the electrolyte surrounding the cathode is prevented from mixing readily with that surrounding the anode. The porous diaphragm is made of alumina or of sodium aluminate or of mixtures of these substances. Sodium, together with a very small quantity of hydrogen, is formed at the cathode. Oxygen and water are formed at the anode. The removal of the water from the fused electrolyte surrounding the anode is facilitated by passing a current of air or other suitable gas through or over it.

Previously to this invention sodium has been made by the electrolytic decomposition of sodium hydroxid, both in scientific laboratories and on the manufacturing scale; but usually the water formed at the anode has been allowed to remain in the electrolyte. Under these circumstances the whole or a large portion of the water reacts with the sodium, being separated at the cathode, thereby reconverting about one-half of it into sodium hydroxid. By the present invention the water is isolated in the portion of the electrolyte surrounding the anode, from which it is evaporated as quickly as it is formed, and this may be facilitated by passing a current of air over or through the electrolyte in the anode-compartment. To carry on the process successfully, it is necessary that the diaphragm should be practically insoluble in fused caustic soda, and this end is secured by making such diaphragm in the first place of alumina, which will combine with the caustic soda and form sodium aluminate, or by making it of the sodium aluminate in the first place. In either case the eventual diaphragm will have a structure somewhat like unglazed porcelain and will not be in the form of a granular powder and will not be vitrified. The diaphragms are made by mixing the chosen substance with water and then molding or compressing to the required shape or pasting the substance on a suitable support, after which they are dried at a comparatively low temperature which never approaches that required to fuse or vitrify them. The means employed to prevent the interaction of the water and sodium are also effective in preventing the recombination of the anodic oxygen and sodium, whereby the quantity of sodium obtained per ampere hour is increased. The small quantity of water first present in the cathode-compartment is rapidly exhausted, after which there is no appreciable loss of metal there produced.

The accompanying drawing represents one of the many forms of apparatus which may be employed for carrying out the process.

In said drawing, $a$ represents one of a number of cells, which may be heated by being placed in a gas-heated chamber $b$, the cells being provided with the usual anode $c$, cathode $d$, a diaphragm $e$, and an air-pipe $f$.

What is claimed is—

1. The improved process for manufacturing sodium which consists in subjecting fused sodium hydroxid to the action of the electric current and separating the metal produced at the cathode from the water and anodic oxygen produced at the anode by a porous diaphragm the main constituent of which is alumina ($Al_2O_3$).

2. The improved process for manufacturing sodium which consists in subjecting fused sodium hydroxid to the action of the electric current and separating the metal produced at the cathode from the water and anodic oxygen produced at the anode by a porous diaphragm and evaporating the water produced at the anode by a current of air.

In testimony whereof I have hereunto set my hand in the presence of two subscribing witnesses.

THOS. EWAN.

Witnesses:
ROBERT THOMSON,
HENRY LAING.